United States Patent [19]

Runkle

[11] 4,311,085
[45] Jan. 19, 1982

[54] HYDRAULIC BRAKE BOOSTER
[75] Inventor: Dean E. Runkle, LaPorte, Ind.
[73] Assignee: The Bendix Corp., Southfield, Mich.
[21] Appl. No.: 95,034
[22] Filed: Nov. 16, 1979
[51] Int. Cl.³ .................. F15B 13/10; F15B 17/02
[52] U.S. Cl. .................. 91/391 R; 91/460; 60/547 A; 60/556; 60/557
[58] Field of Search .................. 91/460, 391 R; 60/547 A, 556, 557

[56] References Cited

U.S. PATENT DOCUMENTS

| | | | |
|---|---|---|---|
| 3,831,491 | 8/1974 | Thomos | 91/460 |
| 3,899,889 | 8/1975 | Swanson et al. | 60/547 |
| 3,988,967 | 11/1976 | Orzel | 91/391 R |
| 4,078,385 | 3/1978 | Zabadneh | 91/460 |
| 4,123,908 | 11/1978 | Bertone et al. | 91/460 |

FOREIGN PATENT DOCUMENTS

| | | |
|---|---|---|
| 2413080 | 10/1975 | United Kingdom .................. 94/460 |
| 1431080 | 4/1976 | United Kingdom . |
| 1432059 | 4/1976 | United Kingdom . |
| 1481838 | 8/1977 | United Kingdom . |
| 1482877 | 8/1977 | United Kingdom . |

*Primary Examiner*—Paul E. Maslousky
*Attorney, Agent, or Firm*—Paul David Schoenle; Ken C. Decker

[57] ABSTRACT

A hydraulic brake booster includes a housing 12 with a first chamber 40 and a second chamber 42. An input member 54 extends into the first chamber 40 and is exposed to the second chamber 42. The input member is movable within the first chamber 40 to increase fluid pressure within the second chamber 42 and this fluid pressure operates a control valve 90 to communicate fluid pressure to the first chamber 40. The fluid pressure in the first chamber 40 acts against the input to bias the same toward the second chamber 42. An output member 70 is movable in response to the fluid pressure within the second pressure chamber 42 to actuate braking.

2 Claims, 3 Drawing Figures

HYDRAULIC BRAKE BOOSTER

BACKGROUND OF THE INVENTION

The present invention relates to a hydraulic brake booster which provides a power assist during a brake application. The hydraulic brake booster includes a housing which communicates with a pressure source such as a power steering pump. A control valve within the housing is operable to control the communication of fluid pressure through the housing. In order to operate the control valve, an input member extends into the housing and is movable during a brake application to impart movement to the control valve. Movement of the control valve communicates fluid pressure to a pressure chamber wherein an output member is movable in response to the fluid pressure to effect a power-assisted brake application.

A hydraulic brake booster such as is illustrated in U.S. Pat. Nos. 3,831,491 and 3,995,529 utilizes an input member to develop fluid pressure within a control chamber. The fluid pressure in the control chamber is communicated to a control valve which moves in response thereto and communicates fluid pressure from a pressure source to a working chamber to bias an output member to a braking position. The control chamber is disposed on the front or input member side of the output member so that the hydraulic brake booster housing must be extended where the input member is located to accommodate the input member and control chamber. This extension of the housing is not acceptable with the smaller more efficient vehicles because of the space limitations within an engine compartment.

The present invention overcomes these space limitations by disposing the control chamber on the side of the booster housing defining an opening for receiving the output member. In addition, the input member extends through a working chamber or first pressure chamber and is exposed to the control chamber or second pressure chamber. The input member is movable within the housing to develop fluid pressure within the second pressure chamber and communicate the fluid pressure to the control valve, whereupon the control valve moves to communicate fluid pressure with the first pressure chamber. The fluid pressure within the first pressure chamber acts against the input member to bias the same toward the second pressure chamber to increase the fluid pressure therein so as to bias the output member to move to actuate braking.

In a preferred embodiment, the housing defines a small diameter bore, a large diameter bore and an intermediate diameter bore. The input member sealingly and movably engages the small diameter bore and the large diameter bore while the output member sealingly and movably engages the intermediate diameter bore.

An advantageous effect of the invention follows that the hydraulic brake booster housing can be made smaller as the control chamber is disposed within an existing portion of the stepped bore rather than requiring an extension of the housing to accommodate the control chamber on the side of the housing supporting the input member.

The invention will now be described by way of example, with reference to the accompanying drawing in which.

Figure 1:
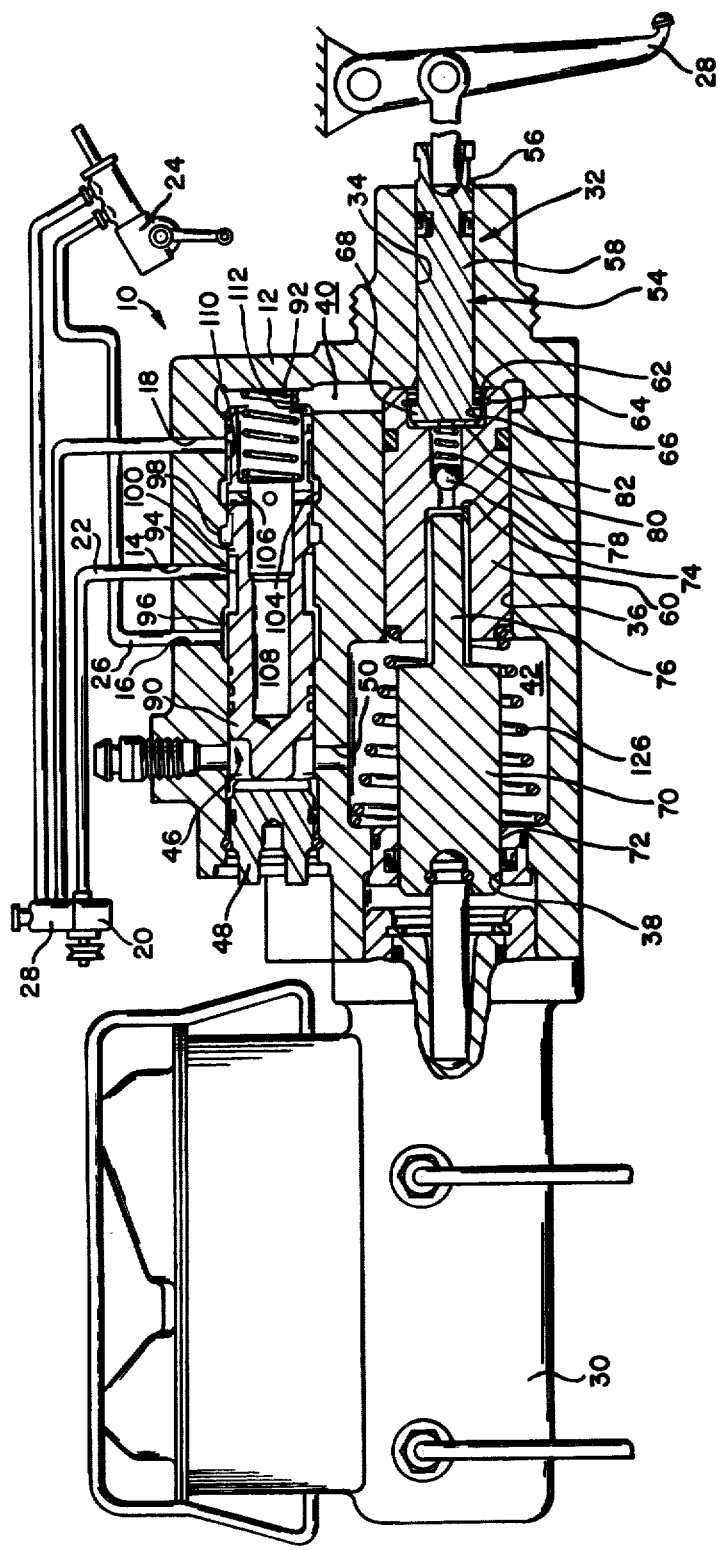
FIG. 1 is a cross-sectional view of a hydraulic brake booster taken along line 1—1 of FIG. 2 integrated with a brake system.
Figure 2:
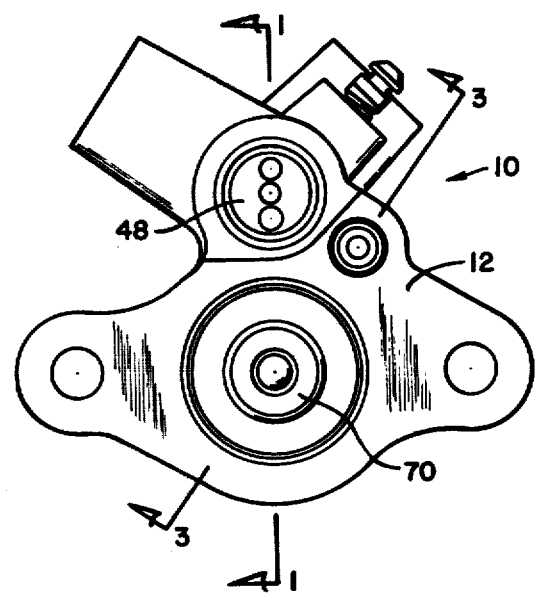
FIG. 2 is a left end view of FIG. 1.

In FIG. 1, a hydraulic brake booster 10 includes a housing 12 defining an inlet 14, an outlet 16 and a return 18. The inlet 14 communicates with a pressure source 20, such as a power steering pump, via a conduit 22 and the outlet 16 communicates with a steering gear 24 via conduit 26. The return 18 and the steering gear 24 communicates with a reservoir 28 connected by suitable means with the power steering pump. The operation of the brake system just described is well known in the art as the hydraulic brake booster 10 receives fluid pressure from the pressure source during a brake application to provide a power assist to the brake application. In a conventional manner the booster 10 is disposed between a brake pedal 28 and a master cylinder 30.

The housing 12 defines a first axially extending stepped bore 32 having a small diameter bore section 34, a large diameter bore section 36 and an intermediate diameter bore section 38. The stepped bore 32 intersects a first or control pressure chamber 40 and a second or working control chamber 42 such that the small and large diameter sections are separated by the chamber 40 and the intermediate and large diameter sections are separated by the chamber 42. The housing also defines a second axially extending bore 46. A plug 48 closes one end of the bore and the other end of the bore leads to the first pressure chamber 40. A passage 50 extending from the second pressure chamber to the one end of the bore 46 opens communication therebetween.

An input member 54 is coupled to the brake pedal 28 and extends into an opening 56 formed by the bore 32. The input member 54 extends into and through the first chamber 40 to sealingly engage the large diameter section 36 as well as the small diameter section 34. The input member is dimensioned to correspond with its associated diameter bore sections so that a small diameter portion 58 sealingly engages bore section 34 and a large diameter portion 60 sealingly engages bore section 36. For convenience, the input member is shown as separate portions 58 and 60; however, it is possible to construct the input member as a single piece or a multiplicity of pieces. To couple the portions 58 and 60 together, a snap ring 62 is disposed within a recess 64 on cavity 66 to oppose a head 68 on portion 58 which extends into cavity 66.

An output member 70 extends into an opening 72 formed by the intermediate diameter section of stepped bore 32. The output member sealingly engages the wall of the opening 72 and extends into the second pressure chamber 42. The output member 70 cooperates with the input member 32 such that a passage 74 in the input member acts as a guide to receive a projection portion 76 of output member 70. The passage 74 extends from the second pressure chamber 42 to the first pressure chamber 40 while check valve 78 within the passage only permits communication of fluid pressure from the second pressure chamber to the first pressure chamber. A spring 80 extending from the portion 58 to the check valve 78 normally biases the latter to a closed position. The portion 58 is provided with end slots 82 to permit fluid communication from check valve 78 to pressure chamber 40. The portion 76 would be splined to also provide for communication of fluid pressure between the portion 76 and the wall of passage 74 while at the same time being guided in its movement within passage 74.

A control valve 90 is movably disposed within the bore 46 and is biased by a spring 92 extending into the first pressure chamber 40 to a rest position abutting plug 48. The control valve is movable in a manner to be described hereinafter from the rest position to a braking position. In the rest position fluid pressure from the pressure source 20 is communicated to the inlet 14, through a recess 94 on control valve 90 and out the outlet 16. When the control valve is moved to the right to the braking position, a land 96 restricts the fluid communication to the outlet 16 so that the fluid pressure within the recess 94 is increased. Moreover, a recess 98 on the bore 46 cooperates with a land 100 on the control valve to form a passage from the recess 94 to another recess 104 on the bore 46. A radial passage 106 is in alignment with the recess 104 at this time so that fluid pressure is communicated to an axially extending passage 108 within the control valve. The axially extending passage opens to the chamber 40 so that fluid pressure is eventually communicated to the chamber 40 from the pressure source 20. Moreover, when the control valve is in the rest position, the recess 104 communicates via another recess 110 on the control valve to the return 18. The pressure chamber 40 is open to the return whenever the land 100 is axially spaced from the recess 98 and closed to the return whenever the land 100 is substantially aligned with the recess. A slot 112 on the end of the control valve opens the axial passage 108 even if the control valve is moved to the right in abutment with housing 12.

Figure 3:
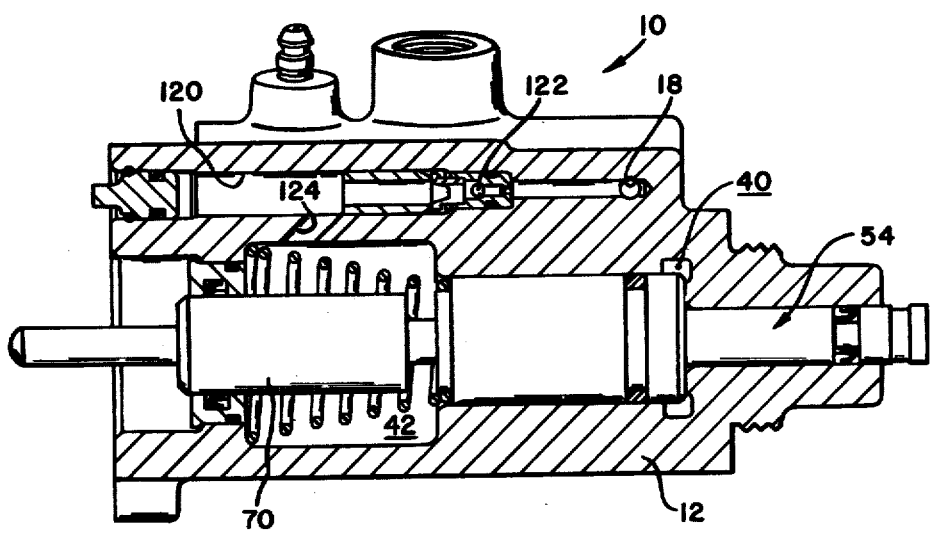
FIG. 3 is a cross-sectional view taken along line 3—3 of FIG. 2.

As shown in FIG. 3, the housing 12 also defines a third axially extending bore 120. A check valve 122 is disposed within the bore 120 between the return 18 and a passage 124 extending from the bore 120 to the pressure chamber 42. The check valve enables the pressure chamber 42 to be replenished from the return 18 when braking is terminated and the input member and/or output member 70 is moving to the right in FIG. 3 to enlarge the volume of chamber 42. However, the check valve prohibits communication of fluid pressure from the pressure chamber 42 to the return 18 via passage 120.

MODE OF OPERATION

When the pedal 28 is pivoted to initiate a brake application, the input member 54 is moved to the left in FIG. 1. The moving large diameter portion 60 and small diameter portion 58 cooperate with the first pressure chamber 40 to enlarge the volume of the latter and initially reduce the fluid pressure therein. The moving large diameter portion 60 also cooperates with the second pressure chamber 42 to increase the fluid pressure therein. Even though the output member 70 may be moving out of the second pressure chamber 42, the difference in diameters between portion 60 and output member 70 at opening 38 contracts the volume of second chamber 42 to initially increase the fluid pressure therein in response to the movement of the input member. Once the fluid pressure within the chamber 42 is sufficient to overcome the tension of spring 92 the fluid pressure within chamber 42 is communicated via passage 50 to act against the left end of control valve 90 and move the same from the rest position illustrated to the braking position. As stated earlier, the control valve is displaced to the right in response to the fluid pressure within chamber 42 so that fluid pressure from the pressure source 20 is communicated to the chamber 40. This communication results from the cooperation of the lands 96 and 100 and the recesses 94, 98 and 104. As earlier mentioned, when the control valve moves to the right the land 96 restricts the opening from the bore 46 to the outlet 16, the land 100 aligns with recess 98 to open communication between recess 94, recess 98 and recess 104. With fluid pressure communicated to recess 104, the radial passage 106 receives fluid pressure from recess 104 to communicate the same to the pressure chamber 40 via passage 108. Thereafter this fluid pressure from the pressure source acts against the differential area of input member 54, that being the large diameter dimension less the small diameter dimension, to assist in moving the input member further to the left. The movement of the input member to the left, whether in response to the initial movement via the pedal 28 solely or in response to the fluid pressure from the pressure source being communicated to the chamber 40, increases the fluid pressure within the chamber 42. This fluid pressure in chamber 42 acts against the output member 70 to bias the latter to the left toward the master cylinder 30 to effectuate braking.

Upon termination of braking, the spring 92 and the fluid pressure within chamber 40 biases the control valve to return to its rest position abutting plug 48. A spring 126 within chamber 42 acts against the input member to bias the latter to return to its rest position wherein the large diameter portion is abutting the housing surrounding bore section 34. If a portion of the fluid trapped within chamber 42 leaks past the control valve 90 during braking, it is possible to replenish this lost fluid by means of the check valve 122, see FIG. 3, as the check valve is responsive to a decrease in fluid pressure within chamber 42 to open the return 18 to the chamber 42.

If the control valve should fail to develop sufficient pressure within the first pressure chamber for any reason, the input member 54 is movable in response to pivotal movement of the brake pedal 28 so that a shoulder within passage 74 is engageable with the end of projection 76 to impart mechanical actuation of the master cylinder 30. It is important that the spring 80 exert a force on the check valve 78 which is greater than the force exerted by spring 92 on control valve 90 so that the spool valve will move before the check valve opens. However, if the control valve becomes wedged within bore 46 for any reason, the check valve will open to vent chamber 42 to chamber 40 after a predetermined buildup of fluid pressure within chamber 42 occurs. Therefore, during a safety mechanical actuation of the master cylinder 30, the input member will not continuously increase fluid pressure within chamber 42 after the predetermined fluid pressure level is reached therein.

I claim:

1. In a hydraulic brake booster, a housing having an input member extending into the housing and an output member extending outwardly of the housing, a valve member carried by the housing to control communication of fluid pressure from a pressure source through the housing via an inlet and an outlet on the housing, the input member being movable within the housing to control movement of the valve member, the housing substantially defining a first pressure chamber and a second pressure chamber, movement of the valve member communicating the inlet with the first pressure chamber to communicate fluid pressure from the pressure source thereto, characterized by said input member extending through said first pressure chamber and being exposed to said second pressure chamber, said input member being movable within the housing to generate fluid pressure within said second pressure chamber, the generated fluid pressure within the second pressure chamber being in communication with the valve member to actuate the latter, the actuated valve member cooperating with the housing to define a fluid path for communicating fluid pressure from the pressure source to said first pressure chamber wherein the fluid pressure acts against the input member to bias the same toward the second pressure chamber, said output member being movable in response to the generated fluid pressure in the second pressure chamber, said input member substantially defining a fluid passage extending from said first pressure chamber to said second pressure chamber and a one-way valve disposed within said fluid passage only permits fluid communication from said second pressure chamber to said first pressure chamber, and said fluid passage receiving a portion of said output member which is movable within said fluid passage.

2. A hydraulic brake booster having a control valve operable to communicate fluid pressure from a pressure source to a first pressure chamber, an input member extending into said first pressure chamber and leading to a second pressure chamber, an output member movable in response to fluid pressure within said second pressure chamber, said input member being movable during a brake application to generate the fluid pressure within said second pressure chamber before the fluid pressure from the pressure source is communicated with said first pressure chamber, said control valve being movable in response to the generated fluid pressure within said second pressure chamber to communicate fluid pressure from the pressure source to said first pressure chamber wherein the latter fluid pressure acts against said input member to bias the same in a direction further increasing the generated fluid pressure within said second pressure chamber, said input member being movably disposed within a housing stepped bore which intersects said first and second pressure chambers, said input member sealingly engaging said stepped bore on opposite sides of said first pressure chamber, said output member sealing said stepped bore on the side of said second pressure chamber remote from said first pressure chamber, and said input member carrying a check valve to permit fluid communication between said first and second pressure chambers when the fluid pressure generated in said second pressure chamber fails to move said control valve.

* * * * *